US009896930B2

(12) United States Patent
Al-Nahdi et al.

(10) Patent No.: US 9,896,930 B2
(45) Date of Patent: Feb. 20, 2018

(54) THREE-DIMENSIONAL RESERVOIR PRESSURE DETERMINATION USING REAL TIME PRESSURE DATA FROM DOWNHOLE GAUGES

(71) Applicant: Saudi Arabian Oil Company, Dhahran (SA)

(72) Inventors: Omar A. Al-Nahdi, Dammam (SA); Sami A. Alnuaim, Dhahran (SA); Alan L. Siu, Dhahran (SA); Ahmad Tariq Al-Shammari, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 819 days.

(21) Appl. No.: 14/014,658

(22) Filed: Aug. 30, 2013

(65) Prior Publication Data

US 2015/0066373 A1     Mar. 5, 2015

(51) Int. Cl.

| G01V 1/00 | (2006.01) |
|---|---|
| E21B 49/00 | (2006.01) |
| G01V 9/00 | (2006.01) |
| E21B 47/06 | (2012.01) |
| G01V 99/00 | (2009.01) |

(52) U.S. Cl.
CPC ............. *E21B 49/00* (2013.01); *E21B 47/06* (2013.01); *G01V 9/00* (2013.01); *G01V 99/005* (2013.01)

(58) Field of Classification Search
CPC ........ E21B 49/008; E21B 43/00; E21B 49/00; G01V 11/00
USPC ............... 703/2, 10; 166/250.02; 702/12, 13
See application file for complete search history.

(56) References Cited

U.S. PATENT DOCUMENTS

| 3,303,704 | A | 2/1967 | Brown et al. | |
|---|---|---|---|---|
| 7,526,418 | B2 * | 4/2009 | Pita | E21B 49/00 702/12 |
| 8,078,328 | B2 * | 12/2011 | Malki | E21B 49/008 166/250.02 |

(Continued)

OTHER PUBLICATIONS

International Search Report and Written Opinion for related PCT application PCT/US2014/049336 dated Sep. 24, 2015.
Foo, "A New Method of Calculating Reservoir Pressure in Real Time", SPE Gas Technology Symposium held in Canada, 2002, pp. 1-8, Society of Petroleum Engineers, SPE 75527.

(Continued)

*Primary Examiner* — John Breene
*Assistant Examiner* — Kaleria Knox
(74) *Attorney, Agent, or Firm* — Bracewell LLP; Constance G. Rhebergen; Christopher L. Drymalla

(57) ABSTRACT

Well production rate, injection rate and pressure data are measured in an existing reservoir using in situ real time measurement gauges. Production and injection rates are entered as input to a history match model in a data processing system. Measures of projected reservoir pressure with time are generated by running the updated history match model using a reservoir simulator. Actual reservoir data values obtained at a given date or time slice from reservoir production are compared with projected data obtained from the reservoir simulator for that same date or time slice. At each time slice, the real-time pressure values measured at the wellbore are converted into reservoir pressures through a well model. The real time reservoir pressure values and the projected reservoir pressure are then used to interpolate the reservoir pressure array over the entire three dimensions using a geostatistical modeling process.

9 Claims, 5 Drawing Sheets

(56) References Cited

U.S. PATENT DOCUMENTS

| | | |
|---|---|---|
| 8,312,320 B2 | 11/2012 | Almadi et al. |
| 8,335,677 B2 | 12/2012 | Yeten et al. |
| 2006/0047489 A1 | 3/2006 | Scheidt et al. |
| 2007/0016389 A1 | 1/2007 | Ozgen |
| 2009/0276100 A1 | 11/2009 | Malki et al. |
| 2009/0276156 A1 | 11/2009 | Kragas et al. |
| 2010/0121623 A1* | 5/2010 | Yogeswaren .......... G01V 11/00 703/2 |
| 2011/0040536 A1 | 2/2011 | Levitan |
| 2011/0060572 A1* | 3/2011 | Brown .................... E21B 43/00 703/10 |
| 2011/0264430 A1 | 10/2011 | Tapscott et al. |
| 2012/0109597 A1 | 5/2012 | Derfoul et al. |
| 2012/0179436 A1 | 7/2012 | Fung |
| 2015/0066373 A1 | 3/2015 | Al-Nahdi et al. |

OTHER PUBLICATIONS

Dogru et al., "A Next-Generation Parallel Reservoir Simulator for Giant Reservoirs", SPE Reservoir Simulation Symposium held in the Woodlands, Texas USA, Feb. 3-4, 2009, pp. 1-29, SPE 119272.

Dogru et al., "New Frontiers in Large Scale Reservoir Simulation", SPE Reservoir Simulation Symposium held in The Woodlands Texas USA, Feb. 21-23, 2011, pp. 1-12, SPE 142297.

DW Peaceman, "Interpretation of Well-Block Pressures in Numerical Reservoir Simulation With Nonsquare Grid Blocks and Anisotropic Permeability", Society of Petroleum Engineers Journal, 1983, pp. 531-543, Society of Petroleum Engineers of AIME.

DW Peaceman, "Interpretation of Well-Block Pressures in Numerical Reservoir Simulation", Society of Petroleum Engineers Journal, 1978, pp. 1-17, Society of Petroleum Engineers of AIME.

International Search Report and Written Opinion dated Sep. 20, 2017 for related PCT Application No. PCT/US2017/030347; 8 pages.

* cited by examiner

THREE-DIMENSIONAL RESERVOIR PRESSURE DETERMINATION USING REAL TIME PRESSURE DATA FROM DOWNHOLE GAUGES

BACKGROUND OF THE INVENTION

1. Field of the Invention

The present invention relates to determination of reservoir pressure over the entirety of a producing hydrocarbon reservoir from a relatively small number of real time downhole pressure measurements obtained at production, injection and observation wells.

2. Description of the Related Art

In the oil and gas industries, massive amounts of data are required to be processed for computerized simulation, modeling and analysis for exploration and production purposes. For example, the development of underground hydrocarbon reservoirs typically includes development and analysis of computer simulation models of the reservoir. These underground hydrocarbon reservoirs are typically complex rock formations which contain both a petroleum fluid mixture and water. The reservoir fluid content usually exists in two or more fluid phases. The petroleum mixture in reservoir fluids is produced by wells drilled into and completed in these rock formations.

A computer reservoir model with realistic geological features and properties, appropriate distribution of in-situ fluids, as well as initial pressure conditions of the fluids also helps in forecasting the optimal future oil and gas recovery from hydrocarbon reservoirs. Oil and gas companies have come to depend on such models as an important tool to enhance the ability to exploit a petroleum reserve.

It is desirable to be able to monitor pressure conditions in such a reservoir so that production is optimized. Adjustments can be made in production or injection rates to remove undesirable high or low pressure regions that might be observed from such monitoring. For reservoir planning purposes, the reservoir is simulated in a computer and runs are made of estimated production for a range of times over the projected life of the reservoir.

In simulation models, the reservoir is organized into a number of individual cells. Seismic data with increasing accuracy has permitted the cells to be on the order of 25 meters areal (x and y axis) intervals. For what are known as giant reservoirs, the number of cells is at least hundreds of millions, and reservoirs of what is known as giga-cell size (a billion cells or more) are encountered.

An example reservoir of the type for which production data are simulated over the expected reservoir life as illustrated by the model M (FIG. 1) is usually one which is known to those in the art as a giant reservoir. A giant reservoir may be several miles in length, breadth and depth in its extent beneath the earth and might, for example, have a volume or size on the order of three hundred billion cubic feet.

The reservoir is organized into a matrix which corresponds to the three dimensional extent of the reservoir and is composed of a number of contiguous 3-dimensional cells. It is common for a reservoir matrix to contain millions of cells to obtain as accurate an indication of reservoir conditions as feasible. Actual reservoir models may have several millions of such cells.

For reservoirs of this type, the actual number of wells may also be on the order of a thousand, with each well having a number of perforations into producing formations. Typically, not all of the wells in a reservoir have what are known as permanent downhole pressure gauges in them to monitor reservoir at those locations. This however represents a pressure measurement at only one point in the huge volume of the reservoir.

Thus, only a relatively small number of wells in a reservoir have such pressure gauges and as mentioned, the reservoir may have a substantial extent in terms of subsurface breadth, width and depth, leading to a very large number of cells in the model. The data points are extremely scarce when compared to the reservoir volume.

Therefore, the conditions and spatial quantity under which the actual well pressure is measured are completely different than the reservoir pressure which reservoir engineers are interested in for reservoir production optimization. Pressure measurements at the limited number of wells having gauges in the reservoir do not provide an accurate indication of reservoir pressure conditions of interest over the full 3-dimensional extent of the reservoir.

SUMMARY OF THE INVENTION

Briefly, the present invention provides a new and improved computer implemented method of obtaining measures in a data processing system of three dimensional reservoir in a subsurface hydrocarbon producing reservoir partitioned for modeling purposes into reservoir model partitioned as an array of a grid of cells extending over the three dimensions of the reservoir, the reservoir having a plurality of production wells producing hydrocarbons, a plurality of injection wells for injection of fluids into the reservoir to stimulate production and a plurality of observation wells for monitoring reservoir pressure, and with less than all of the production, injection and observation wells having permanent downhole pressure measurement systems installed in them. The computer processing method of the present invention receives in real time pressure and flow rate data from the production wells, real time pressure and flow rate data from the injection wells and real time pressure from the observation wells based on measurements from the measurement systems. Simulated pressure calculations are performed on a reservoir simulator in the data processing system of the reservoir pressure in the cells of the full array of cells extending over the three dimensions of the reservoir using the history match model with updated production and injection rates. A measure of pressure difference between real time reservoir pressure and simulated pressure is obtained for wells having downhole pressure gauges. A geostatistical interpolation is performed of pressure in the cells of the full array of cells extending over the three dimensions of the reservoir based on the obtained measure of difference between real time reservoir pressure and simulated pressure for the wells. A measure of real time upscale pressure over the full array of the three dimensions of the reservoir is then performed based on the results of the performed geostatistical interpolation, and the measure of real time upscale pressure over the full array of the three dimensions of the reservoir is assembled in memory of the data processing system.

The present invention also provides a new and improved data processing system for obtaining measures in a data processing system of three dimensional reservoir in a subsurface hydrocarbon producing reservoir partitioned for modeling purposes into reservoir model partitioned as an array of a grid of cells extending over the three dimensions of the reservoir, the reservoir having a plurality of production wells producing hydrocarbons, a plurality of injection wells for injection of fluids into the reservoir to stimulate production and a plurality of observation wells for monitoring reservoir pressure, and with less than all of the production, injection and observation wells having permanent downhole pressure measurement systems installed in them. The data processing system includes a processor which receives in real time pressure and flow rate data from the production wells, real time pressure and flow rate data from the injection wells and real time pressure data from the observation wells based on measurements from the measurement systems. The processor obtains a measure of real time reservoir pressure for wells having permanent downhole pressure measurement systems installed therein based on pressure measurements from the measurement systems, and performs simulated pressure calculations on a reservoir simulator of the reservoir pressure in the cells of the full array of cells extending over the three dimensions of the reservoir using the history match model with updated production and injection rates. The processor also obtains a measure of pressure difference between real time reservoir pressure and simulated pressure for the wells. The processor performs a geo statistical interpolation of pressure in the cells of the full array of cells extending over the three dimensions of the reservoir based on the obtained measure of difference between real time reservoir pressure and simulated pressure for the wells, and forms a measure of real time upscale pressure over the full array of the three dimensions of the reservoir based on the results of the performed geostatistical interpolation. The processor assembles the measure of real time upscale pressure over the full array of the three dimensions of the reservoir; and a memory of the data processing system stores the assembled measure of real time upscale pressure over the full array of the three dimensions of the reservoir. An output display of the data processing system forms a display of selected ones of the determined measure of real time upscale pressure over the full array of the three dimensions of the reservoir.

The present invention also provides a new and improved data storage device having stored in a computer readable medium computer operable instructions for causing a data processing system to obtain measures in a data processing system of three dimensional reservoir in a subsurface hydrocarbon producing reservoir partitioned for modeling purposes into reservoir model partitioned as an array of a grid of cells extending over the three dimensions of the reservoir, the reservoir having a plurality of production wells producing hydrocarbons, a plurality of injection wells for injection of fluids into the reservoir to stimulate production and a plurality of observation wells for monitoring reservoir pressure, and with less than all of the production, injection and observation wells having permanent downhole pressure measurement systems installed therein. The instructions stored in the data storage device cause a processor in the data processing system to receive in real time pressure and flow rate data from the production wells, real time pressure and flow rate data from the injection wells and real time pressure from the observation wells based on measurements from the measurement systems. The instructions also cause the processor to obtain a measure of real time reservoir pressure for wells having permanent downhole pressure measurement systems installed in them based on pressure measurements from the measurement systems, and to perform simulated pressure calculations on a reservoir simulator of the reservoir pressure in the cells of the full array of cells extending over the three dimensions of the reservoir using the history match model with updated production and injection rates. The instructions also cause the processor to obtain a measure of pressure difference between real time reservoir pressure and simulated pressure for the wells. The instructions then cause the processor to perform geostatistical interpolation of pressure in the cells of the full array of cells extending over the three dimensions of the reservoir based on the obtained measure of difference between real time reservoir pressure and simulated pressure for the wells, and to form a measure of real time upscale pressure over the full array of the three dimensions of the reservoir based on the results of the performed geostatistical interpolation. The instructions also cause the processor to assemble the measure of real time upscale pressure over the full array of the three dimensions of the reservoir; and to store in a memory of the data processing system the assembled measure of real time upscale pressure over the full array of the three dimensions of the reservoir.

DETAILED DESCRIPTION OF THE PREFERRED EMBODIMENTS

Figure 1:
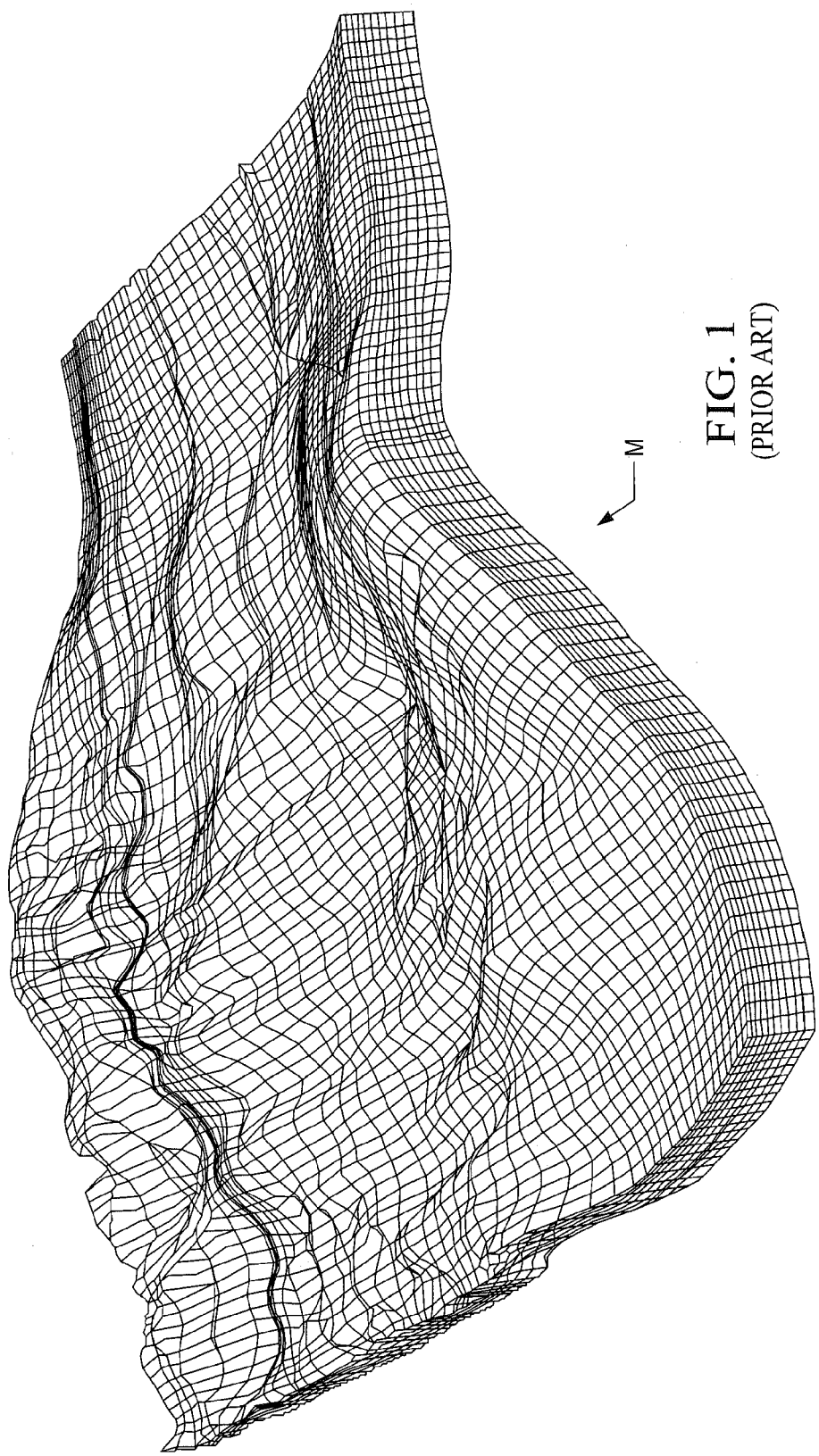
FIG. 1 is a schematic diagram of a model of a subsurface hydrocarbon reservoir.

In the drawings, the letter M designates a simplified model of a portion of a subsurface hydrocarbon reservoir for which production results based on operating conditions and parameters are simulated over an estimated production life according to the present invention based on geological and fluid characterization information obtained for the cells of the reservoir. The results obtained are thus available and used for simulation of historical performance and for forecasting of production from the reservoir. Based on the results of such simulation, models such as those described and shown in U.S. Pat. No. 7,526,418 are then formed and are available for evaluation and analysis. U.S. Pat. No. 7,526,418 is owned by the assignee of the present invention and is incorporated herein by reference.

For a giant reservoir, the physical size of the reservoir may be several miles in length, breadth and depth in its extent beneath the earth and might, for example, have a volume or size on the order of three hundred billion cubic feet. The number of cells for a reservoir of this size is, for example, typically on the order of hundreds of millions.

For reservoirs of this type, the actual number of wells may also be on the order of a thousand, with each well having a number of perforations into producing formations. Typically, a limited number of the wells in a reservoir have what are known as permanent downhole pressure gauges in them to monitor reservoir at those locations. This, however, represents a pressure measurement at only one point in the volume of the reservoir.

Thus, only a few wells in a reservoir have such pressure gauges and as mentioned, the reservoir may have a substantial extent in terms of subsurface breadth, width and depth, leading to a very large number of cells in the model. The reservoir pressure data points are extremely scarce when compared to the reservoir volume.

Figure 2:
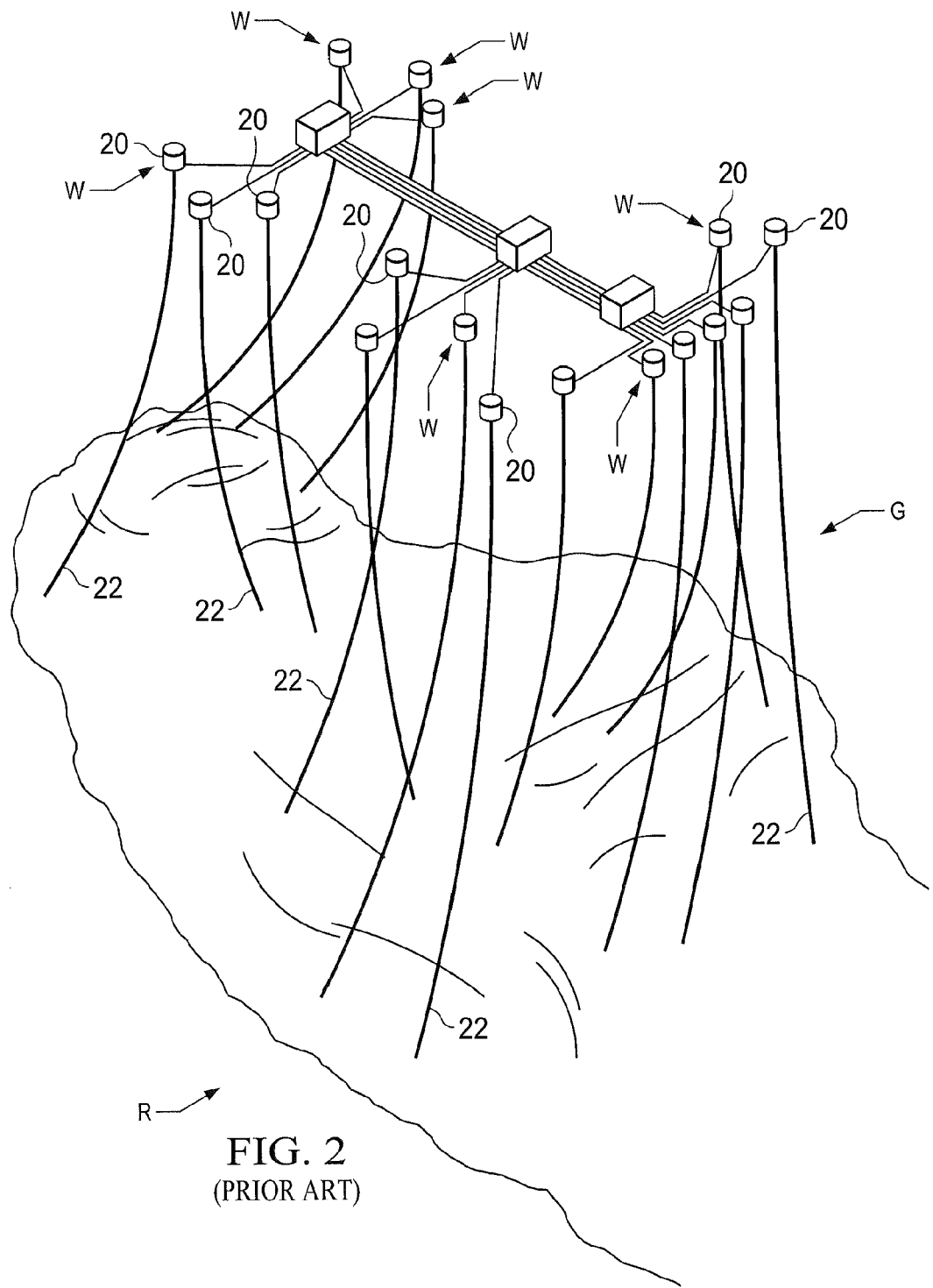
FIG. 2 is a schematic diagram showing a pressure downhole measuring system installed in a selected number of wells in the reservoir of FIG. 1.

FIG. 2 illustrates an example placement of a group G of wells W from a portion of a large reservoir R of the type and size exemplified by the model M of FIG. 1. The wells in the group G typically include production wells, injection wells and observation wells and are spaced over the extent of the reservoir. As indicated, certain ones of the wells W represented by the group G are provided with permanent downhole measurement systems 20, which are known as PDHMS. The PDHMS 20 may, for example be of the type described in U.S. Pat. Nos. 8,078,328 and 8,312,320, commonly owned by the assignee of the present application. The subject matter disclosed in U.S. Pat. Nos. 8,078,328 and 8,312,320 is incorporated herein by reference.

The PDHMS 20 include surface units which receive reservoir and well data in real time from downhole sensors 22. The downhole sensors 22 obtain data of interest, and for the purposes of the present invention the downhole sensors include downhole pressure and temperature sensors located in the wells W at selected depths and positions in the selected group G of wells among the much larger number of wells in the reservoir.

The downhole sensors 22 furnish the collected real-time pressure and temperature data from the wells W in which they are installed, and a supervisory control and data acquisition (SCADA) system with a host computer or data processing system D (FIG. 4) collects and organizes the collected data form the wells in the group G. The PDHMS 20 also includes sensors to record production and injection data for the injection wells in the group G, which data is also collected and organized by the supervisory control and data acquisition.

Figure 3:
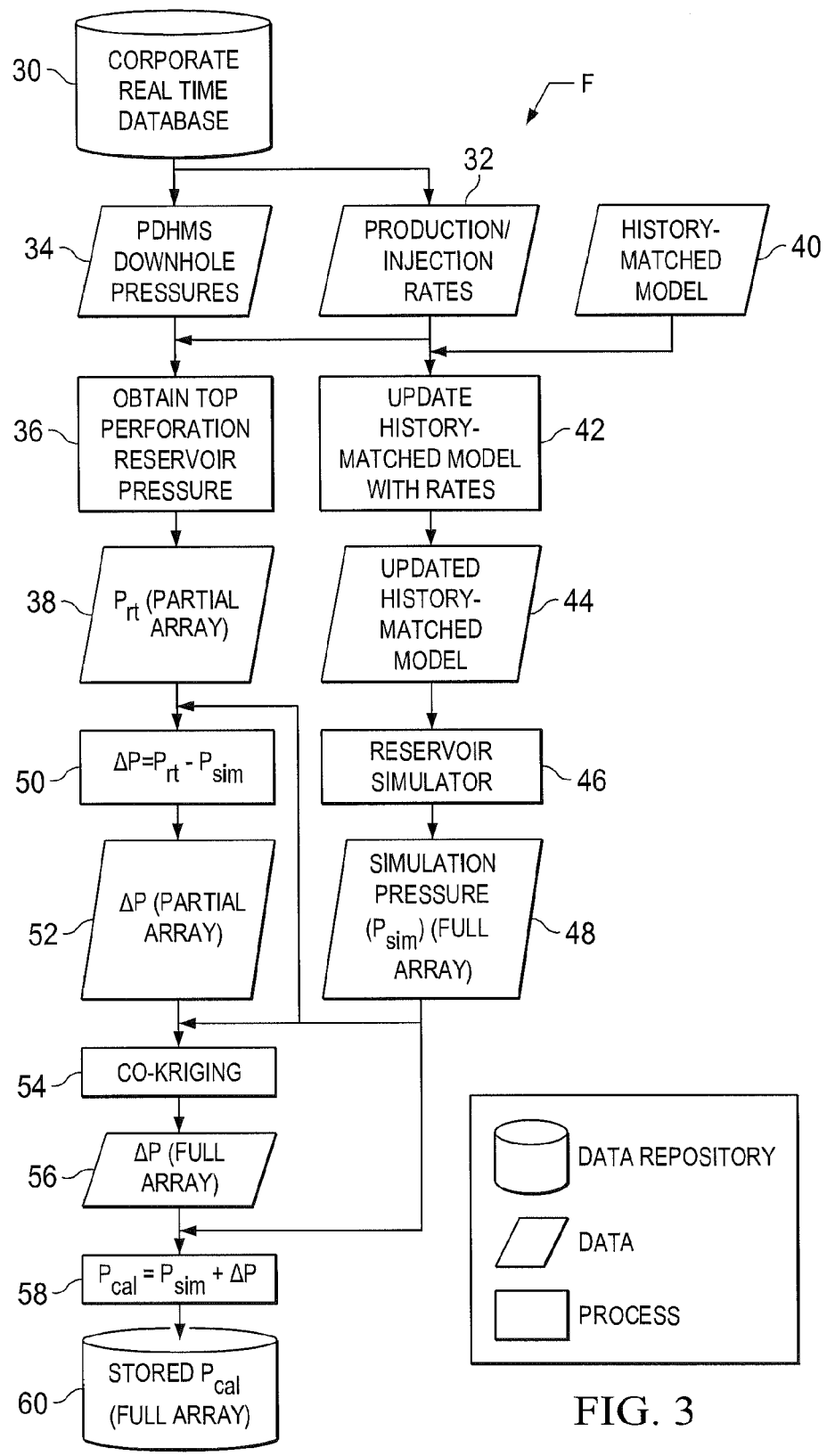
FIG. 3 is a functional block diagram of a set of data processing steps performed in a data processing system for three-dimensional reservoir pressure determination using real time pressure data from downhole gauges according to the present invention.

Turning to FIG. 3, a flow chart F displays a set of processor steps performed according to the methodology of the present invention in a data processing system D (FIG. 4) for three-dimensional reservoir pressure determination using real time pressure data from downhole gauges according to the present invention. The flowchart F indicates the basic computer processing sequence of the present invention and the computation taking place in the data processing system D for three-dimensional reservoir pressure determination according to the present invention.

As indicated at step 30, the methodology of the present invention is based on input data which includes downhole pressures measured as described above at production, injection and observation wells W by the PDHMS as shown in FIG. 2, as well as the real time production and injection rates obtained by the PDHMS 20 during production from production wells and injection from injection wells W. During step 30, the real time production and injection rates, and the downhole pressures are filtered to remove short term transients, and stored for use as daily data input entries as production and injection rates in step 32 and downhole pressures in step 34. The real time well pressure values measured at downhole gauges are converted to flowing bottom hole pressure (FBHP) values at the top perforations based on the calculated pressure gradient between the two gauges installed in the well, and these FBHP values transformed into reservoir pressures though a well model.

As indicated at an input to step 42 in FIG. 3, the production and injection rates in step 32 collected during step 30 are used to update the history match model which is run in step 40 on the data processing system D (FIG. 4) to generate three dimensional reservoir pressure distribution at selected times of interest known as time slices.

The production and injection rates are entered as additional input data to the history match model in step 40. The updated history match model in step 44 is run in step 46 using a suitable reservoir simulator, such as the reservoir simulator known as GigaPOWERS, and described in SPE 142297, "New Frontiers in Large Scale Reservoir Simulation", 2011, (Dogru) and SPE 119272, "A Next-Generation Parallel Reservoir Simulator for Giant Reservoirs", 2009, (Dogru).

Using the downhole pressure in step 34, at each time slice the reservoir pressure values at well top perforation locations are formed through a well model (Peaceman, 1978, 1983) during step 36 as a Real Time Pressure object $P_{rt}$. A suitable such well model is described, for example, in Peaceman, D. W.: "Interpretation of Well Block Pressures in Numerical Reservoir Simulation," SPEJ (June 1978) 183-94; Trans., AIME, 265 and Peaceman, D. W.: "Interpretation of Well Block Pressures in Numerical Reservoir Simulation with Non-Square Grid Blocks and Anisotropic Permeability," SPEJ (June 1983) 531-43. The Real Time Pressure object $P_{rt}$ is stored for well top perforation locations in step 38 as a partial pressure array which is a three dimensional property object for the well perforations in wells W in the reservoir having downhole pressure measurement systems 22. Normally, wells are completed in the oil zone only especially when the reservoir is under primary depletion; therefore, important pressure information in the gas and water zones is missing from the data obtained from the production well data readings. To improve the quality of the Calibration Pressure, it is preferable to include pressure data collected in the gas and water zone in observation wells. If this data is not available, then such data can be selected from the simulation pressure at a few strategic locations. The resultant real time pressure object $P_{rt}$ in step 38 is loaded into a suitable commercially available Geophysical & Geological (G & G) software packages. The G & G software package which provides arithmetic operations for objects, geo statistical interpolation functionalities and graphical display functionalities for the present invention. The processing G & G software may be, for example, that known as Petrel available from Schlumberger, Ltd.

The three dimensional simulation pressure array determined during step 46 by the reservoir simulator for the entire model is written at pre-described time slices or instants. The updated history match model during step 46 generates a reservoir pressure array $P_{sim}$ for the full array of cells of the entire reservoir at pre-described time slices of interest.

During step 48, the simulation reservoir pressure arrays at pre-described time slices are imported into Petrel or similar G & G software package as simulation pressure objects $P_{sim}$.

Step 50 involves the computer C (FIG. 4) calculating a measure of pressure difference between real time reservoir pressure and simulated pressure for the wells using Petrel or similar G & G software package. A Pressure Difference object ΔP, which is defined as Real Time Pressure minus Simulation Pressure, is created in step 52. Since calculations for Real Time Pressure are performed for well top perforations, the ΔP partial array contains calculated values at the same locations only.

Step 54 involves the computer C (FIG. 4) forming an upscale Pressure Difference object ΔP for all the cells in the reservoir R using Petrel or similar G & G software package. The upscale Pressure Difference object ΔP is populated during step 54 using a geostatistical interpolation functionality.

A preferable such geostatistical interpolation functionality is the interpolation methodology known as Kriging. The kriging interpolation methodology provides a geostatistical estimation of the values of reservoir pressure throughout the three dimensions of the reservoir. The kriging methodology that infers a value of reservoir pressure random field at reservoir cells at coordinates in the three dimensions in the reservoir where no reservoir pressure data readings are available. The kriging interpolation is based on input kriging parameter values obtained from processing data readings made by the permanent downhole sensor gauges 22 of the PDHMS 20 of wells W.

During the geostatistical interpolation kriging of step 54, the simulation pressure difference object, which is the difference between the real time pressure and simulation pressure, is used as the primary kriging parameter, and the simulation pressure object $P_{sim}$ is used as the co-kriging parameter. A suitable technique of such kriging is known as fast Collocated co-kriging which is implemented using a known decomposition that allows splitting into kriging and a simple Bayesian co-kriging update (Petrel 2011—Property Modeling Course Manual) that is available as a module in Petrel or similar G & G software package. It should be understood that other functionalities may also be used, if desired.

During step 54, the sparsely populated Pressure Difference object ΔP is fully populated for the full array of the three dimensions of the reservoir in step 56 using the kriging methodology described above. As indicated at step 58, a resultant real time upscale pressure $P_{cal}$ is formed by the computer C (FIG. 4) for the full array of the three dimensions of the reservoir from the simulation pressure results of step 48 $P_{sim}$ and the fully populated ΔP results of step 56.

The resultant real time upscale pressure $P_{cal}$ in step 60 is assembled during step 58 in memory of the data processing system D (FIG. 4) and thereafter available for output display using Petrel or a similar G & G software package, and analysis of the pressure distribution by reservoir engineers for production/injection optimization.

The present invention provides an excellent way of visualizing the three dimensional reservoir pressure distribution using real time production and injection data, which include downhole pressure, measured at well locations. Using the information provided by the present invention, reservoir engineers can get rid of unwanted high or low pressure regions in the reservoir quickly through adjustment of production and injection rates, or planning of new wells in order to optimize the field production.

Figure 4:
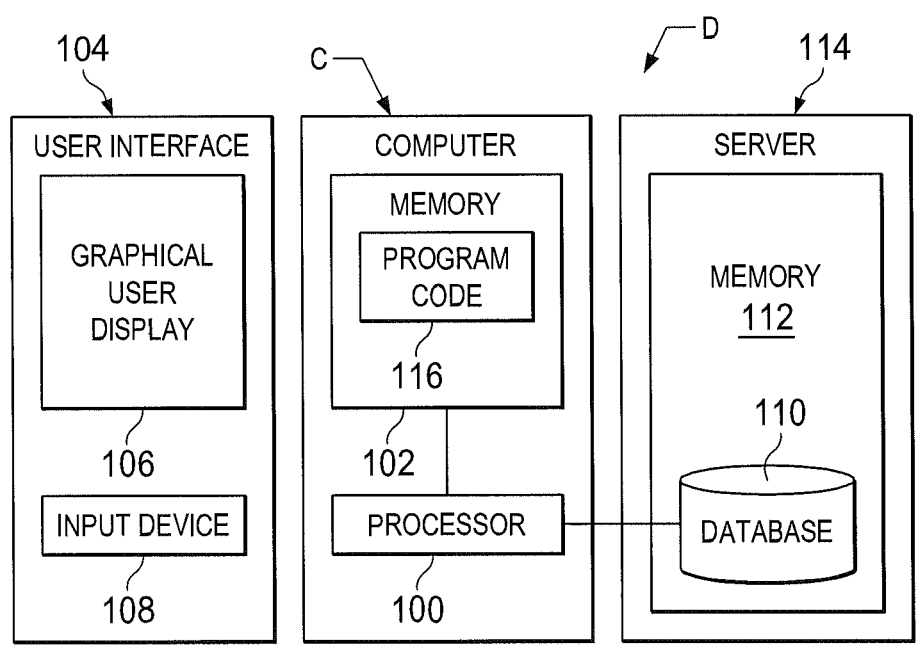
FIG. 4 is a schematic block diagram of a data processing system for three-dimensional reservoir pressure determination using real time pressure data from downhole gauges of subsurface earth formations according to the present invention.

As illustrated in FIG. 4, the data processing system D according to the present invention includes a computer C having a processor 100 and memory 102 coupled to the processor 100 to store operating instructions, control information and database records therein. The data processing system D can be a computer of any conventional type of suitable processing capacity, such as a mainframe, a personal computer, laptop computer, or any other suitable processing apparatus. It should thus be understood that a number of commercially available data processing systems and types of computers may be used for this purpose.

The computer C has a user interface 104 and an output data display 106 for displaying output data or records of three-dimensional reservoir pressure determination using real time pressure data from downhole gauges according to the present invention. The output display 106 includes components such as a printer and an output display screen capable of providing printed output information or visible displays in the form of graphs, data sheets, graphical images, data plots and the like as output records or images.

The user interface 104 of computer C also includes a suitable user input device or input/output control unit 108 to provide a user access to control or access information and database records and operate the computer C. Data processing system D further includes a database 110 stored in computer memory, which may be internal memory 102, or an external, networked, or non-networked memory as indicated at 112 in an associated database server 114.

The data processing system D includes program code 116 stored in non-transitory form in memory 102 of the computer C. The program code 116 according to the present invention is in the form of non-transitory computer operable instructions causing the data processor 100 to perform the computer implemented method of the present invention in the manner described above and illustrated in FIG. 3.

It should be noted that program code 116 may be in the form of microcode, programs, routines, or symbolic computer operable languages that provide a specific set of ordered operations that control the functioning of the data processing system D and direct its operation. The instructions of program code 116 may be stored in non-transitory form in memory 102 of the computer C, or on computer diskette, magnetic tape, conventional hard disk drive, electronic read-only memory, optical storage device, or other appropriate non-transitory data storage device having a computer usable medium stored thereon. Program code 116 may also be contained on a data storage device such as server 114 as a non-transitory computer readable medium.

The methodology of the present invention has been applied for a synthetic reservoir data set in the history matched model and the calibrated real-time three dimensional reservoir pressures and the results were compared to the synthetic model. The Calibration Pressure obtained for reservoir cells using the interpolation methodology of the present invention was found to be closer to the Real Time Pressure than the Simulation Pressure. Hence, the techniques of the present invention provide a valuable tool for visualizing real time reservoir pressure.

A synthetic model of a working field in Saudi Arabia was created to test the methodology. The synthetic model has 6 million cells and 83 wells. The synthetic simulation model represented the reservoir state and it is used to generate the real-time data. A history matched model with about 70% matching quality was constructed from the synthetic model.

To provide a quantitative assessment of the results obtained in the synthetic data test, an R-factor was determined. The R-factor is a measure of the deviation of the calibrated pressure from the real reservoir pressure relative to the simulation pressure. It is calculated using the following formula $$R = \text{abs}\left(\frac{P_{rt} - P_{cal}}{P_{rt} - P_{sim}}\right) \leq 1$$

Figure 5:
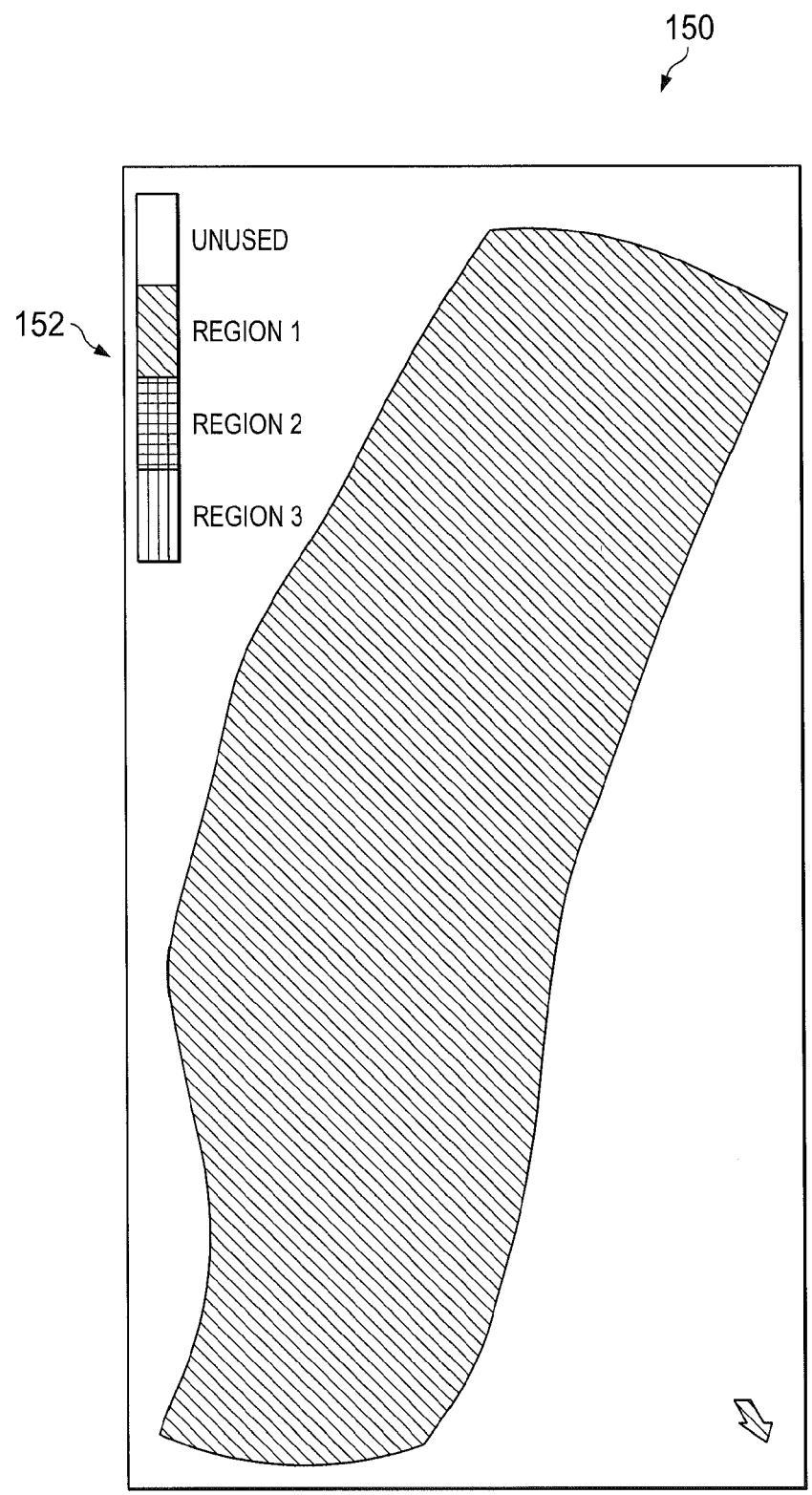
FIG. 5 is a display of results of comparison of reservoir pressure of a synthetic reservoir model with results from three-dimensional reservoir pressure determination using real time pressure data from downhole gauges of subsurface earth formations according to the present invention.

If R is less than one, then the calibrated pressure $P_{cal}$ is closer to real-time pressure $P_{rt}$ than simulation pressure $P_{sim}$. FIG. 5 is a display of the R-factor for the experiment performed. The uniformity of the plotted results indicates a value of the plotted R-factor at 150 is within a range indicated by a display key 152 of less than 1 for the portion of the reservoir plotted. In actual practice the data plot 150 is typically in color and is an almost uniform color the value of the R-factor displayed throughout the data plot and identified by an accompanying color in display key 152.

From the foregoing, it can be seen that the present invention provides for observations made of well data made during real time to ensure excellent quality of the Calibration Pressure object $P_{cal}$. Well production rate, injection rate and pressure data are measured in an existing reservoir using in situ real time measurement gauges. Production and injection rates are entered as input to a history match model in a data processing system. Measures of reservoir pressure with time are generated by running the updated history match model. At each time slice, the real-time pressure values measured at the wellbore are converted into reservoir pressures through a well model. The difference between the real time reservoir pressure values and simulation pressure values are then used to interpolate the reservoir pressure array over the entire three dimensions using a geostatistical modeling process. The calibrated pressure for each cell is then calculated as the sum of the pressure difference and the simulation pressure.

From the foregoing, it can be seen that with the present invention, field pressure data is measured using Pressure Down Hole Measurements Systems (PDHMS) installed in the wellbores. The data points are usually scarce when compared to the reservoir volume. Therefore, the conditions and spatial quantity under which the well pressure is measured are completely different than the reservoir pressure of interest to reservoir. The present invention, which takes advantage of real-time measurement, reservoir simulation and statistical interpolation, provides a way to determine three dimensional reservoir pressure distribution in real time based on pressure data obtained from PDHMS.

The production rates are entered as input to the history match model. The evolution of the reservoir pressure with time is generated by running the updated history match model. At each time slice, the real-time pressure values measured at the wellbore are converted into reservoir pressures through a well model. The real time reservoir pressure values are then used to interpolate the three dimensional reservoir pressure array using geostatistical interpolation Co-kriging methodology.

The present invention allows reservoir engineers to monitor the reservoir pressure distribution using real time data. Hence, any unwanted high or low pressure regions can be mitigated through adjustment of production and injection rates, or planning of new wells in order to optimize the field production. This in turn can increase oil production and reduce fluid injection costs.

The invention has been sufficiently described so that a person with average knowledge in the matter may reproduce and obtain the results mentioned in the invention herein Nonetheless, any skilled person in the field of technique, subject of the invention herein, may carry out modifications not described in the request herein, to apply these modifications to a determined methodology, or in the performance of the same, requires the claimed matter in the following claims; such techniques and procedures shall be covered within the scope of the invention.

It should be noted and understood that there can be improvements and modifications made of the present invention described in detail above without departing from the spirit or scope of the invention as set forth in the accompanying claims.

What is claimed is:

1. A method of obtaining in a computer measures of three dimensional pressure distribution in a subsurface reservoir during production of fluids from the subsurface reservoir to determine three dimensional reservoir pressure distribution in real time in the reservoir and monitor reservoir pressure distribution during the production of fluids, the reservoir being partitioned for modeling purposes into a reservoir model partitioned as an array of a grid of cells extending over the entire three dimensions of the reservoir, the reservoir having a plurality of production wells producing hydrocarbons, and a plurality of injection wells for injection of fluids into the reservoir to stimulate production, and with less than all of the production and injection wells serving as observation wells and having permanent downhole pressure measurement sensors installed to measure downhole pressure in the observation wells, the computer having a processor, a memory and a reservoir simulator, the method comprising the computer processing steps of:

(a) receiving in the computer real time production pressure and flow rates during production of fluids from the production wells, (b) receiving in the computer real time injection pressure and flow rates from the injection wells during injection of fluids into the reservoir;

(c) receiving in the computer real time downhole pressure measures from the downhole sensors in the observation wells based on measurements from the permanent downhole pressure measurement sensors during the production and injection of fluids in the observation wells;

(d) obtaining measures of real time reservoir pressure for a partial pressure array of wells, the wells in the partial pressure array consisting of the observation wells, the measure of real time reservoir pressure being based on the received real time production and injection pressure data from the permanent downhole pressure measurement sensors in the observation wells;

(e) receiving in memory of the computer the obtained measures of real time reservoir pressure for a partial pressure array of wells;

(f) forming with the reservoir simulator simulated pressure measures for the cells of the full array of cells of the reservoir model extending over the entire three dimension extent of the reservoir;

(g) obtaining with the processor of the computer measures of pressure differences between the real time reservoir pressure measures for the partial array of the observation wells and the simulated pressure measures for cells in the array of grid cells at locations of the permanent downhole pressure measurement sensors in the observation wells;

(h) performing in the processor of the computer a geostatistical interpolation of real time pressure in the cells extending over the full array of the three dimensions of the reservoir based on the obtained measures of pressure difference between real time reservoir pressure for the partial array of the observation wells and the simulated pressure measures for the cells in the array of grid cells at locations of the permanent downhole pressure measurement sensors in the observation wells;

(i) populating the reservoir model with real time upscale pressure for the cells extending over the entire three dimension extent of the reservoir based on the results of the performed geostatistical interpolation of real time pressure;

(j) assembling in the memory of the computer the populated reservoir model with real time upscale pressure in the cells over the entire three dimension extent of the reservoir;

(k) forming an output display of selected cells of the populated reservoir model with real time upscale pressure in the selected cells over the entire three dimension extent of the reservoir for determining three dimensional reservoir pressure distribution in real time in the reservoir and monitoring reservoir pressure distribution during the production of fluids;

(l) identifying, based on the real time upscale pressure in the cells over the entire three dimension extent of the reservoir, high or low pressure regions in the reservoir; and (m) adjusting production rates of the production wells and injection rates of the injection wells to reduce reservoir pressure in the high pressure regions or increase reservoir pressure in the low pressure regions in the reservoir.

2. The method of claim 1, wherein the step of performing a geostatistical interpolation of pressure comprises performing a kriging operation based on the obtained measures of real time reservoir pressure for wells having downhole pressure gauges.

3. The method of claim 2, wherein the obtained measure of pressure difference between real time reservoir pressure and simulated pressure for the wells is used as a primary kriging parameter for performing the kriging operation.

4. The method of claim 2, wherein the simulated reservoir pressure is used as a co-kriging parameter for performing the kriging operation.

5. A system for obtaining measures during production of fluids from a subsurface reservoir of three dimensional pressure distribution in the subsurface reservoir to determine three dimensional reservoir pressure distribution in real time in the reservoir and monitor reservoir pressure distribution during the production of fluids, the reservoir being partitioned for modeling purposes into a reservoir model partitioned as an array of a grid of cells extending over the entire three dimensions of the reservoir, the reservoir having a plurality of production wells producing hydrocarbons, a plurality of injection wells for injection of fluids into the reservoir to stimulate production, and with less than all of the production and injection wells serving as observation wells, the system comprising:

(a) a plurality of permanent downhole pressure measurement sensors installed in the observation wells to measure downhole pressure in the observation wells;

(b) a computer having a processor performing the steps of:

(1) receiving real time production pressure and flow rate data from the production wells during production of fluids:

(2) receiving real time injection pressure and flow rate data from the injection wells during injection of fluids;

(3) receiving real time downhole pressure measures from the downhole sensors in the observation wells based on measurements from the permanent downhole pressure measurement sensors during the production and injection of fluids;

(4) obtaining measures of real time reservoir pressure for a partial pressure array, the partial pressure array consisting of the observation wells, based on the received real time production and injection pressure data from the permanent downhole pressure measurement sensors in the observation wells;

(c) the computer further having a reservoir simulator performing the step of forming simulated pressure measures for the cells of the full array of cells extending over the entire three dimension extent of the reservoir with a reservoir simulator in the data processing system;

(d) the processor further performing the steps of:

(1) obtaining measures of pressure differences between the real time reservoir pressure measures for the partial array of the observation wells and the simulated pressure measures for cells in the array of grid cells at locations of the permanent downhole pressure measurement sensors in the observation wells;

(2) performing a geostatistical interpolation of real time pressure in the cells extending over the full array of the three dimensions of the reservoir based on the obtained measures of pressure difference between real time reservoir pressure for the partial array of the observation wells and the simulated pressure measures for the cells in the array of grid cells at locations of the permanent downhole pressure measurement sensors in the observation wells;

(3) populating the reservoir model with real time upscale pressure for the cells extending over the entire three dimension extent of the reservoir based on the results of the performed geostatistical interpolation of real time pressure;

(4) assembling the populated reservoir model with real time upscale pressure in the cells over the entire three dimension extent of the reservoir; and (e) the computer further having a memory storing the assembled populated reservoir model with real time upscale pressure in the cells over entire three dimension extent of the reservoir;

(f) an output display forming a display of selected cells of the assembled populated reservoir model with real time upscale pressure in the selected cells over the entire three dimension extent of the reservoir for determining three dimensional reservoir pressure distribution in real time in the reservoir and monitor reservoir pressure distribution during the production of fluids;

(g) identifying, based on the real time upscale pressure in the cells over the entire three dimension extent of the reservoir, high or low pressure regions in the reservoir; and (h) adjusting production rates of the production wells and injection rates of the injection wells to reduce reservoir pressure in the high pressure regions or increase reservoir pressure in the low pressure regions in the reservoir.

6. The system of claim 5, wherein the processor in performing a geostatistical interpolation of pressure performs a kriging operation based on the obtained measures of real time reservoir pressure for wells having downhole pressure gauges.

7. The system of claim 6, wherein the processor in performing a kriging operation uses the obtained measure of pressure difference between real time reservoir pressure and simulated pressure for the wells as a primary kriging parameter.

8. The system of claim 6, wherein the processor in performing a kriging operation uses the obtained simulated pressure as a co-kriging parameter.

9. A method of obtaining during production of fluids from a subsurface reservoir real time measures of three dimensional pressure distribution in the subsurface reservoir to monitor reservoir pressure distribution during the production of the fluids, the reservoir being partitioned for modeling purposes into a reservoir model partitioned as an array of a grid of cells extending over the entire three dimensions of the reservoir, the reservoir having a plurality of production wells producing hydrocarbons, and a plurality of injection wells for injection of fluids into the reservoir to stimulate production, the method being performed with the permanent downhole pressure measurement sensors, and with a computer having a processor, a memory and a reservoir simulator, the method comprising the steps of:

(a) obtaining, by the computer from production permanent downhole measurement sensors at each of the production wells for measuring production pressure and flow rates during production of fluids from the production wells, real time measurements of the production pressure and flow rates during production of fluids from the production wells;

(b) obtaining, by the computer from injection permanent downhole measurement sensors at each of the injection wells for measuring injection pressure and flow rates during injection of fluids into the injection wells, real time measurements of the injection pressure and flow rates from the injection wells during injection of fluids into the reservoir;

(c) obtaining, by the computer from observation permanent downhole measurement sensors at each of a plurality of observation wells for measuring downhole pressure in the observation well, real time measurements of the downhole pressure in the observation wells during the production and injection of fluids in the observation wells, the observation wells comprising a subset of the production and injection wells;

(d) obtaining measures of real time reservoir pressure for a partial pressure array of wells, the wells in the partial pressure array consisting of the observation wells, the measure of real time reservoir pressure being based on the received real time production and injection pressure data from the permanent downhole pressure measurement sensors in the observation wells;

(e) receiving in memory of the computer the obtained measures of real time reservoir pressure for a partial pressure array of wells;

(f) forming with the reservoir simulator simulated pressure measures for the cells of the full array of cells of the reservoir model extending over the entire three dimension extent of the reservoir;

(g) obtaining with the processor of the computer measures of pressure differences between the real time reservoir pressure measures for the partial array of the observation wells and the simulated pressure measures for cells in the array of grid cells at locations of the permanent downhole pressure measurement sensors in the observation wells;

(h) performing in the processor of the computer a geostatistical interpolation of real time pressure in the cells extending over the full array of the three dimensions of the reservoir based on the obtained measures of pressure difference between real time reservoir pressure for the partial array of the observation wells and the simulated pressure measures for the cells in the array of grid cells at locations of the permanent downhole pressure measurement sensors in the observation wells;

(i) populating the reservoir model with real time upscale pressure for the cells extending over the entire three dimension extent of the reservoir based on the results of the performed geostatistical interpolation of real time pressure;

(j) assembling in memory of the data processing system the populated reservoir model with real time upscale pressure in the cells over the entire three dimension extent of the reservoir;

(k) forming an output display of selected cells of the populated reservoir model with real time upscale pressure in the selected cells over the entire three dimension extent of the reservoir for determining three dimensional reservoir pressure distribution in real time in the reservoir and monitor real time reservoir pressure distribution during the production of fluids;

(l) identifying, based on the real time upscale pressure in the cells over the entire three dimension extent of the reservoir, high or low pressure regions in the reservoir; and (m) adjusting production rates of the production wells and injection rates of the injection wells to reduce reservoir pressure in the high pressure regions or increase reservoir pressure in the low pressure regions in the reservoir.

* * * * *